Patented Feb. 9, 1937

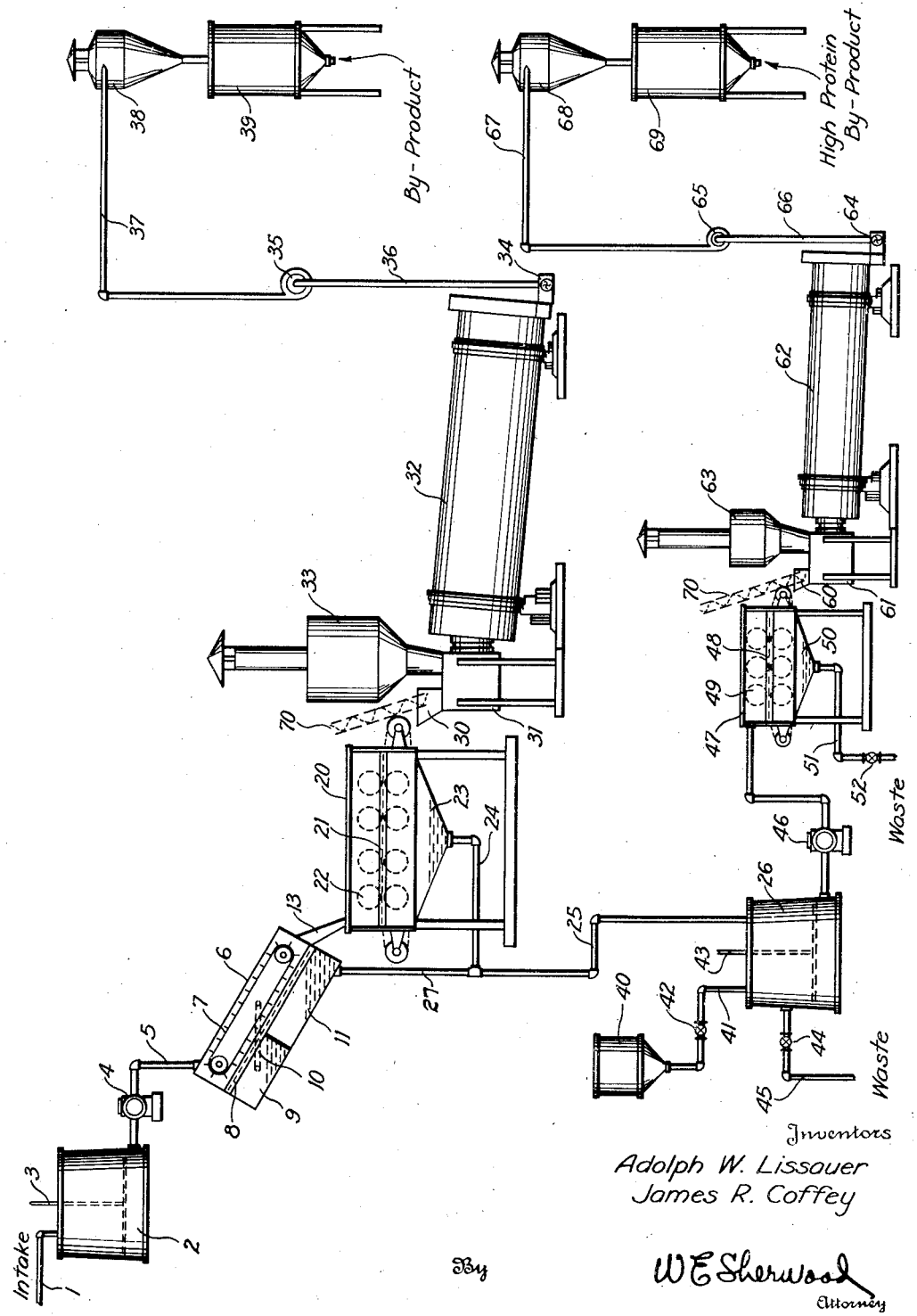

2,070,285

UNITED STATES PATENT OFFICE 2,070,285

FEED SUBSTANCES DERIVED FROM DISTILLERY SLOP AND METHOD OF PRODUCING SAME

Adolph W. Lissauer and James R. Coffey, Louisville, Ky., assignors, by mesne assignments, to Louisville Drying Machinery Company, Incorporated, Louisville, Ky., a corporation of Kentucky Application October 16, 1934, Serial No. 748,505

6 Claims. (Cl. 99—5)

The present invention relates to a process of treating distillery slop whereby a distinctive, new and useful by-product may be obtained having a higher protein content than any heretofore produced. The average distillery slop remaining in the still following the distillation process comprises a large amount of grain elements held in a state of suspension, and a smaller amount, comprising approximately 1% of the total grain elements, held in a state of solution. The solids held in suspension consist to a large extent of bran, coarse husk particles of the original grain, and yeast particles. These coarse suspended solids contain an appreciable amount of protein and form a desirable feed substance when dried and freed from undesirable ingredients such as lactic acid, gums and resins. The size of these suspended solids is by no means uniform and heretofore much difficulty has been experienced in attempts to recover the small suspended particles which due to their minute size do not readily lend themselves to the usual mechanical filtering processes. The soluble grain elements contain albumens and albuminoids, the presence of which apparently causes the greater part of the insoluble grain elements to assume a state of colloidal suspension. In order to recover these suspended elements it is obvious that some means of changing their phase and inducing a precipitation is required.

It has long been recognized that the larger, heavier bran and husk particles of distillery slop have a smaller protein content than do the smaller suspended solids. For example, it is estimated that the heavier bran solids which can be mechanically filtered, contain approximately 22% to 29% of protein, whereas the smaller suspended solids contain approximately 40% of protein. The soluble grain element which constitutes only 1% of the slop has a protein content of only 12%.

Various methods of reclaiming these grain elements in the slop have been proposed. The simplest process merely embodies filtering the heavier and larger particles from the slop, pressing and drying the filtered solids and running the filtrate off as waste. In such a method only a portion of the available protein in the grain is recovered while the most desirable part is lost. Another process employs the evaporation of the filtrate and includes the evaporation of the soluble grain elements. While this method recovers all the protein to be found in the slop it has many marked disadvantages. The process is very expensive and the resulting by-product is actually inferior to that produced by the simpler process. The gums, resins, lactic acid and other undesirable components of the slop are incorporated in the by-product and due to the larger mass of by-product produced the percentage of protein therein becomes less than the protein percentage of the simpler process.

This invention is directed toward the elimination of these disadvantages, and has for an object the teaching of a relatively inexpensive method of producing distillery by-products. A second object is the teaching of an improved method for completely precipitating the suspended solids of a distillery slop. Another object is the provision of means for producing two separate by-products from distillery slop. Another object is the provision of means for rapidly reclaiming the suspended grain elements from distillery slop.

Another object is the production of a high-protein content feed substance derived from distillery slop while a further object is an improved method of disposing of waste materials from a distillery.

Other objects and advantages of the invention will be made apparent from the following disclosure of the same when considered in connection with the drawing, of which;

The accompanying drawing is a diagrammatic view of one form of installation suitable for carrying out the invention.

An inlet pipe 1 conveys the hot, thick slop from the distillery to a vat 2 in which an agitating means 3 is placed for the purpose of preventing a premature settling of the heavy bran particles. From vat 3 the thick slop is forced by a suitable pump means 4 through a pipe 5 into a filtering means 6. This filtering means is preferably of that type which permits a thorough refiltering of the filtrate and comprises a moving conveyor element 7 which carries the slop along a screen 8 through which the liquid may pass into an upper compartment 9. From this compartment the liquid may drain through a by-pass 10 and refilter through the moving separated solids passing into a lower compartment 11. It will be understood that filtering means 6 is shown only diagrammatically and that several stages of refiltration may be employed if such should prove to be desirable or necessary.

From filter 6 the separated solids pass through a chute 13 and fall upon a moving screen 21 of press 20. The screen is driven by any suitable means (not shown) and carries the separated solids between rolls 22 which serve to express from the same any liquid remaining therein.

The liquid pressed from the solids falls into the lower part 23 of the press whence it is conducted by pipes 24 and 25 into a mixing vat 26. Similarly, the liquid collected in the lower compartment 11 of filter 6 passes through pipes 27 and 25 and is collected in mixing vat 26. This liquid which is led from filter 6 and press 20 is the thin slop having a relatively high temperature and comprising the small suspended grain elements held in colloidal suspension as well as the soluble grain elements and quantities of water.

The separated solids leaving press 20 fall into a hopper 30 at the inlet end 31 of a dryer 32. Any suitable type of dryer may be used, but it is found in practice that a dryer of the countercurrent type wherein the drying medium and the material to be dried move in opposite directions is most desirable. As shown, the dryer 32 has an exhaust 33 for the drying medium and an outlet 34 for the dried materials.

The dried materials may be moved through pipes 36 and 37 by any suitable means such as a fan 35, and directed into a separator 38 from which they may fall into a storage bin 39 while the air passes out the separator vent.

A suitable precipitation agent is placed in tank 40 and passes into mixing vat 26 through pipe 41 controlled by a valve means 42. This agent may be any of a number of chemical substances which have the property of changing the phase of the colloidal suspended grain elements. As a result of our experiments we have discovered that such agents as calcium hypochlorite, sodium hypochlorite, potassium hypochlorite, bleaching powder, gaseous chlorine or a solution of chlorine in water will have the desired effect. It is thought that this effect is due to the action of the hypochlorous acid found in the resulting solution. Hypochlorous acid readily disassociates to form chlorine, oxygen and hydrochloric acid and the action of the chlorine and/or oxygen upon the albumens and albuminoids in the soluble grain portion of the slop so affects the same that the resulting coagulation of these albumens and albuminoids will result in a precipitation of the organic matter which said albumens and albuminoids tend to hold in colloidal suspension.

It is found that the best operation is obtained when the precipitation agent in tank 40 thoroughly mixed with cold water prior to mixing it with the thin slop. When the solution in tank 40 is thus kept cold, a maximum of hypochlorous acid and a minimum of the chlorates will be retained therein. Consequently, when the solution of the precipitation agent is mixed with the hot, thin slop, a rapid reaction will take place due in part to the temperature of said slop.

While the use of the above mentioned precipitation agents alone gives a satisfactory coagulation of the colloidal suspensions in the slop, nevertheless it is found advisable in certain instances to mix with the precipitation solution some auxiliary agent such as trisodium phosphate, soda ash or the like. This auxiliary agent induces a rapid clarification of the liquid in the thin slop and carries downward as a precipitate the light, fine particles of the grain elements released from the colloidal suspensions by the chlorinating agent.

Vats 2 and 26 are ordinarily placed out of doors and partially uncovered so that any gases, such as $CO_2$, which may be contained therein will be able to escape readily. In vat 26 a mixing and agitating means 43 is provided for the purpose of thoroughly mixing the precipitation agent with the thin slop. When the operation of this mixing means ceases, a rapid and complete precipitation of the suspended grain elements in the slop then takes place. Ordinarily, this precipitation is completed within 15 to 20 minutes, leaving a precipitate at the bottom of the vat and a clear supernatant liquid above such precipitate.

Upon opening a valve 44 this liquid may then be drained away in the form of a waste material through a pipe 45.

An important feature of the hypochlorous acid described above resides in its property of acting as a powerful oxidizing and/or chlorinating agent. It readily destroys low organisms and as a result the liquid waste drained off through pipe 45 has been thoroughly sterilized and cannot later putrefy. In general, this liquid waste comprises large quantities of water, salts of lactic acid, a small amount of hydrochloric acid and the soluble grain elements including the undesirable gums and resins. This liquid can be drained into water courses without further treatment and will not have a deleterious effect upon the same.

After the waste liquid has been drained from vat 26 a pump means 46 moves the precipitate to a press 47 wherein a moving screen 48 carries the wet precipitate between rolls 49 expressing any liquid which may be held by these precipitated solids. This liquid passes into the lower part 50 of the press and is led away by a pipe 51 controlled by a valve 52. It is obvious that if so desired, pipe 51 may be connected to pipe 45 in order to form a single outlet for the waste liquid.

It is apparent that any suitable type of press may be used for expressing the liquid from the wet precipitate. For convenience, a roll type filter press has been shown. A number of other types of press known to those familiar with the art could be used with equal success.

The precipitate formed from the thin slop in vat 26 is considered the most desirable by-product which can be recovered from distillery slop. The small crushed grain particles found in the mash have a relatively higher protein content than the heavier, larger husk particles constituting the bran. Since these smaller particles have been in a state of colloidal suspension, they were not filtered out of the slop as it passed through filter 6, while on the other hand the larger bran particles were so filtered out and separated. Consequently, the precipitate leaving press 47 comprises small, flaky particles of the choicest particles of the grains used in forming the mash and will have a protein content of approximately 40%. Since these valuable grain elements have heretofore been drained off with the waste and mixed with lactic acid, gums and resins of the soluble elements, it becomes apparent that we have reclaimed from distillery slop an entirely new and useful feed substance.

The relative proportion of heavy bran solids and the smaller suspended solids varies according to the nature of the mash used in the still. For example, in a rye slop a greater proportion of the grain elements will be found in a state of colloidal suspension than will be found in a Bourbon slop. Consequently, the process of this present invention lends itself particularly well to the recovery of useful feed substances from a rye slop, since the thin slop only is being treated with the precipitation agent. However, it is obvious that the process is in no way limited to use with any particular type of distillery slop.

An optional mode of handling the precipitate leaving press 47 is contemplated and shown diagrammatically by the drawing. The precipitate falls from the press into a hopper 60 which leads into the inlet 61 of a dryer 62, similar in construction to dryer 32 but of a somewhat smaller capacity. Through hopper 60 runs a conveyor means 70, shown in broken lines, and adapted to convey the precipitate to the hopper 30 at the inlet of the larger dryer 32. Such a conveyor may be of any desired construction and may utilize any of the conventional control means for regulating the amount of the light precipitate conveyed to hopper 30.

By the use of such a conveyor any desired amount of the high protein precipitate may be mixed with the separated low protein solids and the quality of the feed substance directed to bin 39 may thus be regulated. It is estimated that if no precipitate is mixed with the separated solids, the feed substance in bin 39 will contain approximately 22% to 29% of protein depending upon the type of mash used in the still. On the other hand, if all the precipitate is mixed with the separated solids the protein content of said feed substance will be approximately 31.5% to 32%. Any desired variation within these limits may be obtained by regulating the amount of precipitate conveyed to hopper 30.

The percentages given herein will depend largely upon the nature of the mash leaving the distillery. We have set forth these percentages merely with a desire to amplify the disclosure and it is to be expressly understood that we do not limit ourselves to these exact figures.

If the production of a high protein feed substance is desired rather than a mixing of the separated solids and the precipitate, the conveyor 70 is taken out of operation and the pressed precipitate falls into hopper 60 and enters the inlet 61 of dryer 62. As it passes through this dryer the moisture of the wet precipitate is driven off and passes out of the dryer exhaust 63. It is important to note that any of the chlorine derived from the disassociation of the hypochlorous acid and held by the wet precipitate will likewise be driven off in this drying step and will pass out of the dryer exhaust.

The dried precipitate in the form of small, flaky particles will be caught in the outlet member 64. Any suitable means such as fan 65 moves the dried material though pipes 66 and 67 forcing it into separator 68 whence the dried material falls into storage bin 69, the air passing out of the separator vent.

This feed substance thus produced has many marked characteristics distinguishing it from the feed substances formerly reclaimed from distillery slop. It has been thoroughly sterilized and dried. In appearance it takes the form of light, flaky particles entirely free of heavy coarse bran husks or shells. Its protein content is approximately 40% and as a result it forms a desirable feed substance for chickens, cattle or the like. Moreover, it is free of lactic acid and gums, resins and other undesirable components contained in the original slop and ordinarily found in the reclaimed product. Consequently, it is able to command a higher market price than any other feeds reclaimed from distillery slop.

Having thus disclosed our invention, it is obvious that variations of the same may be employed without departing from the teaching thereof and it is our intention to cover by the appended claims such changes as may reasonably be included within the scope thereof.

We claim:

1. The method of producing a high protein-content feed substance consisting of the small grain elements normally held in colloidal suspension in distillery slop comprising, separating from the slop the heavy, large suspended solids of low protein-content, adding a chlorinating agent to the resulting thin slop to coagulate the soluble proteids therein and to release the small suspended grain elements of high protein-content from the colloidal suspensions, separating from the thin slop the grain elements released from the broken suspensions and forming therefrom a separate feed substance of high protein-content.

2. The method of producing a high protein-content feed substance consisting of the small grain elements normally held in colloidal suspension in distillery slop comprising, separating from the slop the heavy, large suspended solids of low protein-content, adding a chlorinating agent to the resulting thin slop to coagulate the soluble proteids therein and to release the small suspended grain elements of high protein-content from the colloidal suspensions, separating from the thin slop the grain elements released from the broken suspensions, drying the same in the presence of air and removing therefrom by means of the air all traces of the chlorine.

3. The method of recovering a high protein-content feed substance consisting of the small grain elements normally held in colloidal suspension in distillery slop comprising, mechanically separating the heavy, large suspended solids of low protein-content from the slop, mixing chlorine with the resulting thin slop to coagulate the soluble proteids therein and to release the small suspended grain elements of high protein-content from the colloidal suspensions, separating the grain elements released from the broken suspensions from the thin slop and drying the same to form a feed substance of high protein-content.

4. The method of producing an unadulterated feed substance of high protein-content consisting of the small grain elements normally held in colloidal suspension in distillery slop comprising, removing the heavy, large suspended solids of low protein-content from the slop, mixing chlorine with the resulting thin slop to coagulate the soluble proteids therein and to release the small suspended grain elements of high protein-content from the colloidal suspensions, removing the grain elements released from the broken suspensions from the thin slop, drying the same and removing all traces of the coagulating agent therefrom to form an unadulterated feed substance.

5. The method of producing a high protein-content feed substance consisting of the small grain elements normally held in colloidal suspension in distillery slop comprising, separating from the slop the heavy, large suspended solids of low protein-content, adding a hypochlorite to the resulting thin slop to coagulate the soluble proteids therein and to release the small suspended grain elements of high protein-content from the colloidal suspensions, separating from the thin slop the grain elements released from the broken suspensions, drying the same in the presence of air and removing therefrom by means of the air all traces of the chlorine.

6. The method of producing a high protein-content feed substance consisting of the small grain elements normally held in colloidal suspension in distillery slop comprising, separating from the slop the heavy, large suspended solids of low protein-content, adding a hypochlorous agent to the resulting thin slop to coagulate the soluble proteids therein and to release the small suspended grain elements of high protein-content from the colloidal suspensions, separating from the thin slop the grain elements released from the broken suspensions, drying the same in the presence of air and removing therefrom by means of the air all traces of the chlorine.

ADOLPH W. LISSAUER.
JAMES R. COFFEY.